US009229132B2

(12) United States Patent
Guha et al.

(10) Patent No.: US 9,229,132 B2
(45) Date of Patent: *Jan. 5, 2016

(54) METEOROLOGICAL PARAMETER FORECASTING

(75) Inventors: Supratik Guha, Chappaqua, NY (US); Hendrik F. Hamann, Yorktown Heights, NY (US); Levente Klein, Tuckahoe, NY (US)

(73) Assignee: International Business Machines Corporation, Armonk, NY (US)

( * ) Notice: Subject to any disclaimer, the term of this patent is extended or adjusted under 35 U.S.C. 154(b) by 353 days.

This patent is subject to a terminal disclaimer.

(21) Appl. No.: 13/176,099

(22) Filed: Jul. 5, 2011

(65) Prior Publication Data

US 2013/0013206 A1    Jan. 10, 2013

(51) Int. Cl.
G06F 19/00 (2011.01)
G01W 1/10 (2006.01)
G01W 1/00 (2006.01)

(52) U.S. Cl.
CPC ........... G01W 1/10 (2013.01); *G01W 2001/006* (2013.01)

(58) Field of Classification Search
CPC ..................... G01W 1/10; G01W 2001/006
See application file for complete search history.

(56) References Cited

U.S. PATENT DOCUMENTS

| 4,015,116 | A | 3/1977 | Bahm |
| 5,583,972 | A | 12/1996 | Miller |
| 6,650,402 | B2 | 11/2003 | Sullivan et al. |
| 7,114,388 | B1* | 10/2006 | French et al. ............... 73/170.16 |
| 7,489,397 | B2 | 2/2009 | Acevedo et al. |
| 7,542,852 | B1* | 6/2009 | Rose et al. ......................... 702/3 |
| 2002/0169557 | A1* | 11/2002 | Gilbert et al. ...................... 702/3 |
| 2005/0206506 | A1* | 9/2005 | Kulesz et al. ............. 340/286.02 |
| 2005/0246103 | A1 | 11/2005 | Mine |
| 2009/0309744 | A1 | 12/2009 | Fu et al. |
| 2010/0204844 | A1* | 8/2010 | Rettger et al. ................. 700/291 |
| 2010/0219983 | A1* | 9/2010 | Peleg et al. .............. 340/870.17 |
| 2010/0309330 | A1 | 12/2010 | Beck |
| 2011/0096167 | A1 | 4/2011 | Pintado et al. |

(Continued)

FOREIGN PATENT DOCUMENTS

| JP | 61137091 A | 6/1986 |
| JP | 2010102557 A | 5/2010 |
| JP | 2010151597 A | 7/2010 |

OTHER PUBLICATIONS

Glasbey et al., "Spatio-Temporal Variability of Solar Energy Across a Region: A Statistical Modelling Approach" Solar Energy vol. 70, No. 4, pp. 373-381, 2001.*

(Continued)

*Primary Examiner* — Mohamed Charioui
*Assistant Examiner* — John Kuan
(74) *Attorney, Agent, or Firm* — Ryan, Mason & Lewis, LLP

(57) ABSTRACT

A method, an apparatus and an article of manufacture for forecasting a meteorological parameter. The method includes analyzing geographically distributed sensor network data to assess spatial and temporal variation of a meteorological parameter in real-time, correlating at least two portions of data from the sensor network to identify a temporal and spatial evolution of the meteorological parameter, and forecasting the meteorological parameter based on the temporal and spatial evolution of the meteorological parameter.

8 Claims, 6 Drawing Sheets

(56) References Cited

U.S. PATENT DOCUMENTS

2011/0295575 A1  12/2011  Levine et al.
2011/0308575 A1* 12/2011  Guillemette .................. 136/246

OTHER PUBLICATIONS

Total Sky Imager Model TSI-440A, Bulletin TSI-440B, 2003 Yankee Environmental Systems, Inc. http://wwwyesinc.com/products/data/tsi440/tsi-440ds.pdf.

* cited by examiner

METEOROLOGICAL PARAMETER FORECASTING

FIELD OF THE INVENTION

Embodiments of the invention generally relate to information technology, and, more particularly, to meteorological technology.

BACKGROUND OF THE INVENTION

Weather forecasting, cloud movement prediction and gaseous contaminations distribution from a localized source are most commonly acquired using satellite data. In existing approaches, the spatial resolutions of the acquired data are of the orders of tens of miles and data localization on a map grid can be shifted from the real geographical locations. Complex models commonly take the high spatial resolution satellite data and combine it with first principle modeling to achieve a local prediction. Based on physical models the weather, solar radiation or contamination is estimated and predicted locally and projected over the long term.

Satellite based models may work on the time scales of hours up to days but would be highly inaccurate for prediction on short term time scale such as minutes. In such cases, local measurements and predictive models are developed for attempted accuracy of short term predictions. Multiple forecasting methods have to be employed to extend the prediction from seconds up to days. The forecasts rely on different information and the degree of physical information that is embedded in such a model changes from one method to another. Forecasting at a timescale, from seconds up to days in advance, the long term (satellite) and short term (local sensors) measurement and prediction has to be combined. To bridge the gap between different data sets and establish a smooth transition from prediction based on different data sets requires physical models to establish the coupling parameters between the two observational models.

Distributed sensor networks are commonly encountered today on large scale geographical areas, such as, for example, solar panels mounted nearby roads and highways systems used for monitoring traffic, solar panels on the roofs of houses that are distributed over large geographical areas, air quality measurement by government agencies that monitor sets of parameters in many cities across the world, satellite based observations or mobile sensor networks such as sensors that are integrated in cars or cell phones such as light sensors for turning on headlights at dusk or locations based on global positioning system (GPS) signals.

Local sensors that can be employed for short term forecasting include, for example, sky cameras to observe cloud movement, pyronometers to measure solar radiation, and corrosion sensors to predict the gaseous contamination of the atmosphere.

SUMMARY OF THE INVENTION

In one aspect of the present invention, techniques for meteorological parameter forecasting are provided. An exemplary computer-implemented method for forecasting a meteorological parameter can include steps of analyzing geographically distributed sensor network data to assess spatial and temporal variation of a meteorological parameter in real-time, correlating at least two portions of data from the sensor network to identify a temporal and spatial evolution of the meteorological parameter, and forecasting the meteorological parameter based on the temporal and spatial evolution of the meteorological parameter.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
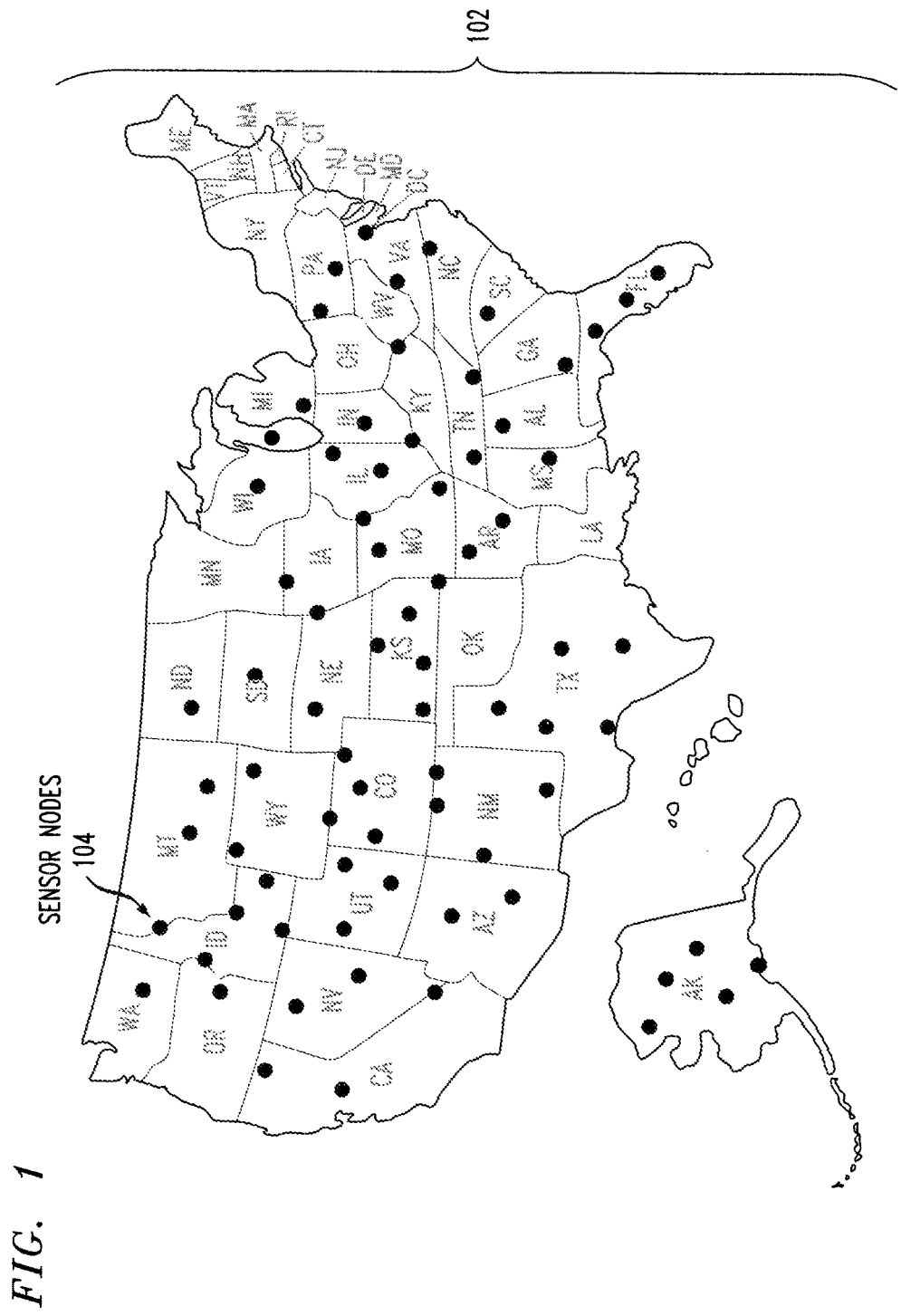
FIG. 1 is a diagram illustrating an example sensor network map, according to an embodiment of the present invention.

As described herein, an aspect of the present invention includes using distributed sensor network (for example, an integrated wide area local/global ground-based sensor network) for forecasting solar power/intensity, cloud movement, and atmospheric gaseous contamination. Geographically distributed sensor network data are used to assess the temporal variation of atmospheric parameters such as solar radiation, wind, cloud movement or atmospheric gaseous contamination. The densely positioned sensors are distributed over a large geographical area and measurements are performed in real-time.

The data obtained from the near neighbors is correlated with data from sensors farther positioned to obtain patterns that are shifted in time (for example, clouds moving from one location to the next location would be observed as a time correlated event in the power production of solar panels that are distributed across a geographical area and are along the path that cloud is traveling). In an aspect of the invention, real-time responses of sensors are used to predict physical parameters in the proximity of a measurement based on long term tracking and analysis of clouds movement and/or wind direction. Additionally, data from closely-spaced sensors can be used to forecast events on a short-time scale while extending the area of sensors analyzed can be used to forecast on a larger and larger time scale. The larger time scale can also be used in connection with geographical distribution of the events.

The forecasting can be calibrated using other global sensors such as satellites that track, on a very large scale, the atmosphere, gaseous contaminations ($SO_2$, $NO_2$, ozone, dust particles, etc.) and/or solar radiation. For short and long term forecasting, an aspect of the invention includes using global observation of physical parameters (satellite measurements) integrated with local measurements to tighten the parameter space used for forecasting. The time evolution of weather parameters such as, for example, change in form and propagation direction of a cloud, can be analyzed and predicted based on measurements from a large set of ground sensors (for example, sky cameras, pyronometers, light detectors, etc.) to predict evolution and induced response at nearby geographically locations.

An aspect of the invention includes providing a system that uses solar panel power output to measure cloud distribution, cloud movement direction and speed. The drop in solar power due to clouds covering the sun will be directly dependent on the cloud optical properties. Power provided is directly related to radiation, and this information is used to predict cloud movement in the sky, as well as to forecast cloud movement. Solar panels used in conjunction with an aspect of the invention provide a higher spatial resolution and a higher temporal resolution than current satellite imaging system that has a very coarse resolution.

The techniques and system detailed herein can also be used to forecast power production from distributed solar farms. Based on a time interval between correlated events extracted from neighbor sensors, the cloud speeds can be estimated. Placing the solar farm at distances where correlation is lost or minimized will ensure that power drops on nearby solar farms will be uncorrelated and the power production can be smoothened over a large distance.

To determine the clouds speed, every power drop data point has a time stamp associated therewith. When the first sensor detects an event, the time stamp is stored in a memory. When the second sensor detects a highly correlated event, the new time stamp is recorded. Knowing the distance between the two sensors, the speed of the traveling cloud is determined as the distance divided by the difference in time between the events recorded by the two sensors. For directional prediction, the data set is divided into regions to facilitate identification of patterns of events.

FIG. 1 is a diagram illustrating an example sensor network map, according to an embodiment of the present invention. By way of illustration, FIG. 1 depicts an example sensor network map 102, containing a network of sensor nodes 104. Accordingly, in a preferred embodiment of the invention, data from a distributed sensor network is analyzed for spatial and temporal variations to extract short and long term correlation. The data from a set of sensors can be used to train a physical model for realistic prediction. The basis of cloud detection or solar power production relies on physical models. These models must include the physical properties of the studied object, such as the optical properties of the clouds that would create a certain solar radiation model on the ground. Such optical properties may be altered by other factors such as humidity, contaminants existing in the atmosphere, etc. To correlate the effect detected by the distributed sensor network, a model can take into account these types of local variations. Once the effect of local parameters is integrated into models, the correlation may be more prevalent. The outcome of the model can be verified against measurements that are performed continuously.

By way of example, a set of sensors distributed over an area can be used to detect cloud movement, wind speed and direction, temperature, solar radiations and/or gaseous contaminations based on correlating the measurement data. It should be appreciated that other parameters can be used in the present invention as well. The sensors are distributed over a large spatial area, as illustrated in FIG. 1, and they record in real-time the physical parameters of interest. The data is analyzed in real-time to extract reoccurring patterns and correlations, starting from the nearest neighbors and extending to farther positioned neighbors.

Additionally, the data can be analyzed for two distinct variations: the spatial and the short and long term temporal variations. The data from the nearest neighbors' sensors are correlated, and then the analysis is extended to the second order neighbors. The sensors data from the two regions are analyzed for correlations and pattern occurrence due to temporal variations. In an aspect of the invention, this same process iteratively continues with farther and farther positioned neighbors as long as the correlation exists.

Figure 2:
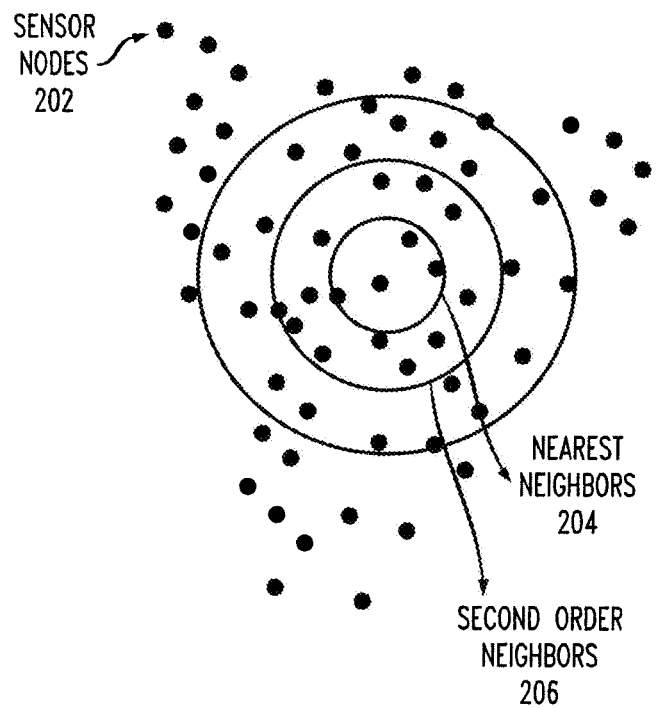
FIG. 2 is a diagram illustrating example neighbor sensor data, according to an embodiment of the present invention.

FIG. 2 is a diagram illustrating example neighbor sensor data, according to an embodiment of the present invention. By way of illustration, FIG. 2 depicts sensor nodes (for example, 202), nearest neighbors 204 and second order neighbors 206. The sensor data from the nearest neighbors gives a snapshot of the physical parameters of interest at every moment of time. By analyzing the data from neighbor sensors (the sensors located inside the first circle in FIG. 2) and extracting time-based correlations, the evolution of the physical parameters can be extracted. Also, based on time intervals between correlated events extracted from neighbor sensors, the speed of propagation can be estimated. For directional prediction, the data set is divided into regions.

Figure 3:
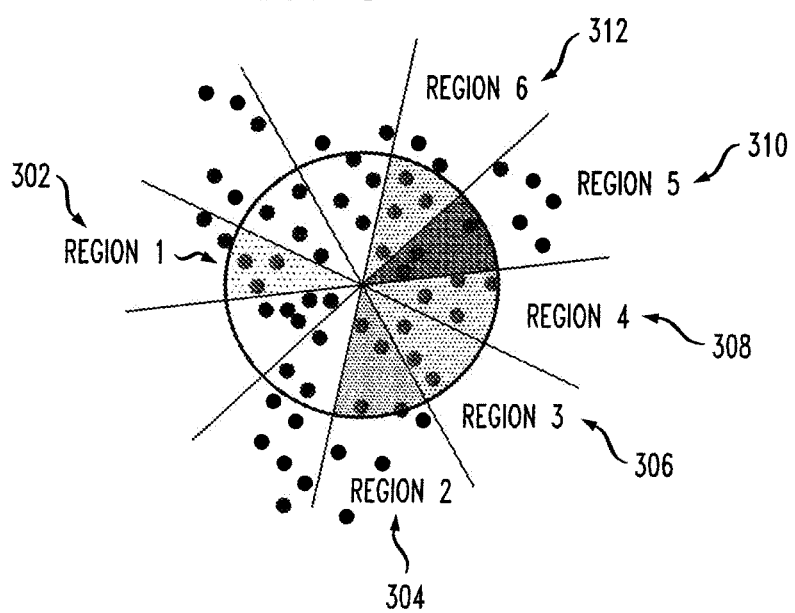
FIG. 3 is a diagram illustrating an example divided set of data, according to an embodiment of the present invention.

FIG. 3 is a diagram illustrating an example divided set of data, according to an embodiment of the present invention. By way of illustration, FIG. 3 depicts region 1 (302), region 2 (304), region 3 (306), region 4 (308), region 5 (310) and region 6 (312). For example, as illustrated in FIG. 3, events occurring in region 1 are correlated with events that are occurring in regions 2, 3, 4, 5, 6, etc. For example, time series analysis of sampled data are analyzed to extract a finer directional information and the extent to which the original event as detected in region 1 is extending at a later moment in region 2, 3, 4, etc. Because the sensors have fixed position, detecting how clouds or contamination is propagating includes assessing the strength of correlation for sensors in adjacent regions. Also, because the time stamp of the event is known, the strength of correlation provides information as to how the event is extending and also as to the main direction of propagation as determined by external factors. The region that has the highest correlations and similar pattern will provide the direction of propagation. The strength of correlation and time when the correlation occur will determine the degree of correlation or lack of correlation.

Figure 4:
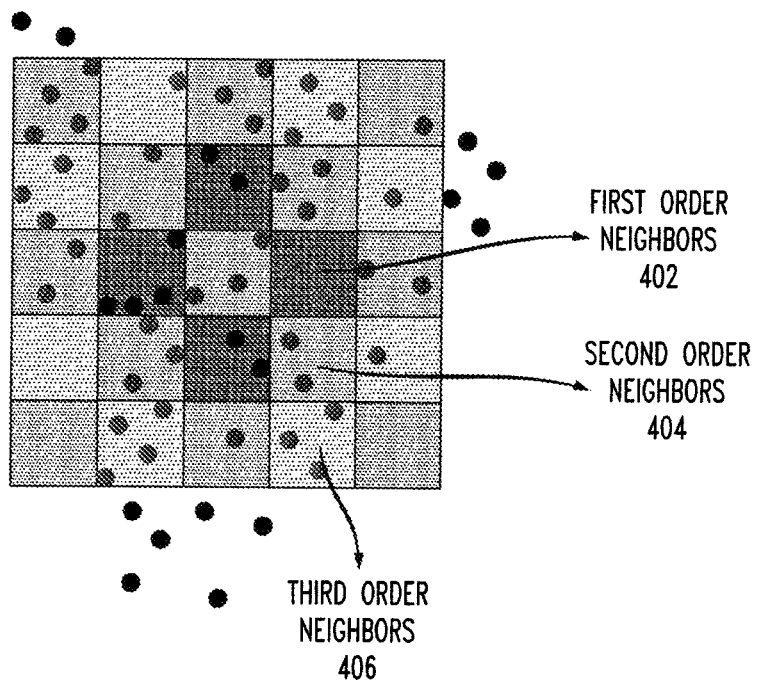
FIG. 4 is a diagram illustrating an example subsequence of data sets, according to an embodiment of the present invention.

Similarly the data can be analyzed as a different subsequence of data sets, such as depicted in FIG. 4.

FIG. 4 is a diagram illustrating an example subsequence of data sets, according to an embodiment of the present invention. By way of illustration, FIG. 4 depicts first order neighbor data 402, second order neighbor data 404 and third order neighbor data 406. Additionally, the first, second and third order neighbor data can be analyzed to extract the direction and speed of propagation of events. Once the speed of propagation and direction is known, physical models can be used to predict events that are appearing at sensors located in the next blocks neighboring the analyzed region. For instance, one example is to determine how contamination is propagating away from a point source and to determine the factors that determine its geographical extent and how concentrations of the pollutants decrease away from the source of pollution. There are multiple factors that contribute to the contamination propagation, such as strength and direction of wind, how quickly the contamination is getting mixed-in with the air and how dilution is occurring over a large area, etc.

The model of data analysis can be used to predict, on a short-term basis, the propagation of a noted event from a sensor to the next neighbor sensors. Also, in an aspect of the invention, the prediction is verified based on sensor measurements that are tracking the event that was forecasted based on the model in certain geographical locations. Specifically, the prediction is verified by continuously monitoring the event in question in the nearby neighbors to ensure that the speed and direction determinations are not suddenly/unexpectedly changing. Further, the model can be self-adjusted to take into account both the prediction and the real measurement data to improve the forecasting.

As described herein, data from the distributed sensor network can provide a snapshot of physical parameters in a given moment of time. For example, the power output of solar panels positioned near roads and highways would give a snapshot of the cloud distribution over the entire geographical area that is covered by the ground based sensors. The local measurements can be used also to recalibrate the larger data sets obtained from satellite and used for weather predictions. Also, the distributed sensor nodes can be used to forecast events and used for energy forecasting such as wind, solar or air contamination propagation.

Accordingly, as detailed herein, an aspect of the invention includes using and analyzing distributed sensor network data is proposed both for spatial and for temporal variations of weather, solar radiation and/or atmospheric contaminations. The real-time data from the sensor network is cross-correlated and analyzed for pattern occurrence to identify and track the time evolution of physical parameters of interest. The parameters are used as inputs in physical models to predict and to forecast both in space and in time. Additionally, in an aspect of the invention, the model is continuously recalibrated based on data from the sensors that are located at and around the area where the prediction was made. The distributed sensor network gives a snapshot of the physical parameters over a very large geographical area, providing an effective method to understand, for example, weather parameters and how they evolve over time.

Figure 5:
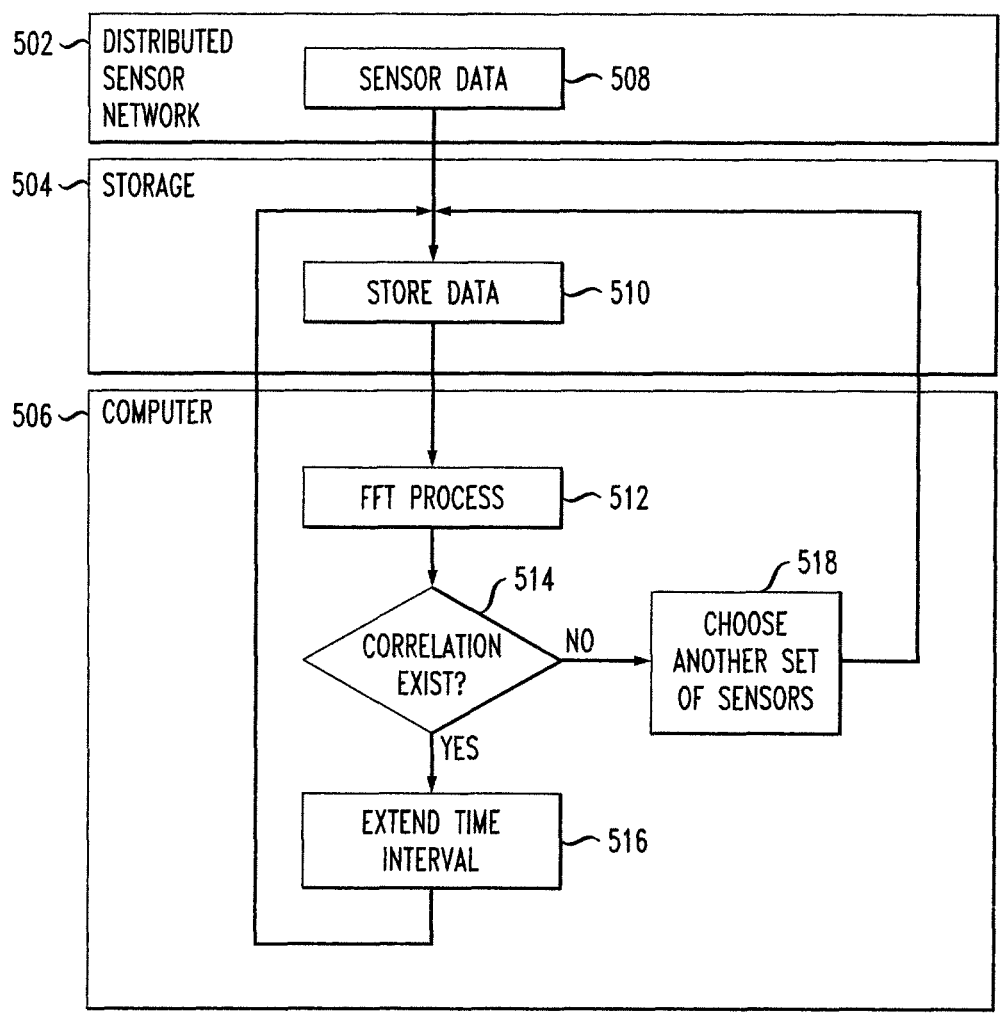
FIG. 5 is a block diagram illustrating an example embodiment, according to an aspect of the invention.

FIG. 5 is a block diagram illustrating an example embodiment, according to an aspect of the invention. By way of illustration, FIG. 5 depicts a distributed sensor network 502, a storage component 504 and a computer component 506. According to an aspect of the invention, the distributed sensor network 502 carries out sensor data collection via module 508, and the storage component 504 stores data in module 510. Further, the computer component 506 carries out a Fast Fourier Transform (FFT) process in module 512 and determines if a correlation exists via module 514. Additionally, if no correlation exists, module 518 chooses another set of sensors and revisiting storage module 510. If a correlation does exist, module 516 extends the time interval and revisiting storage module 510.

Figure 6:
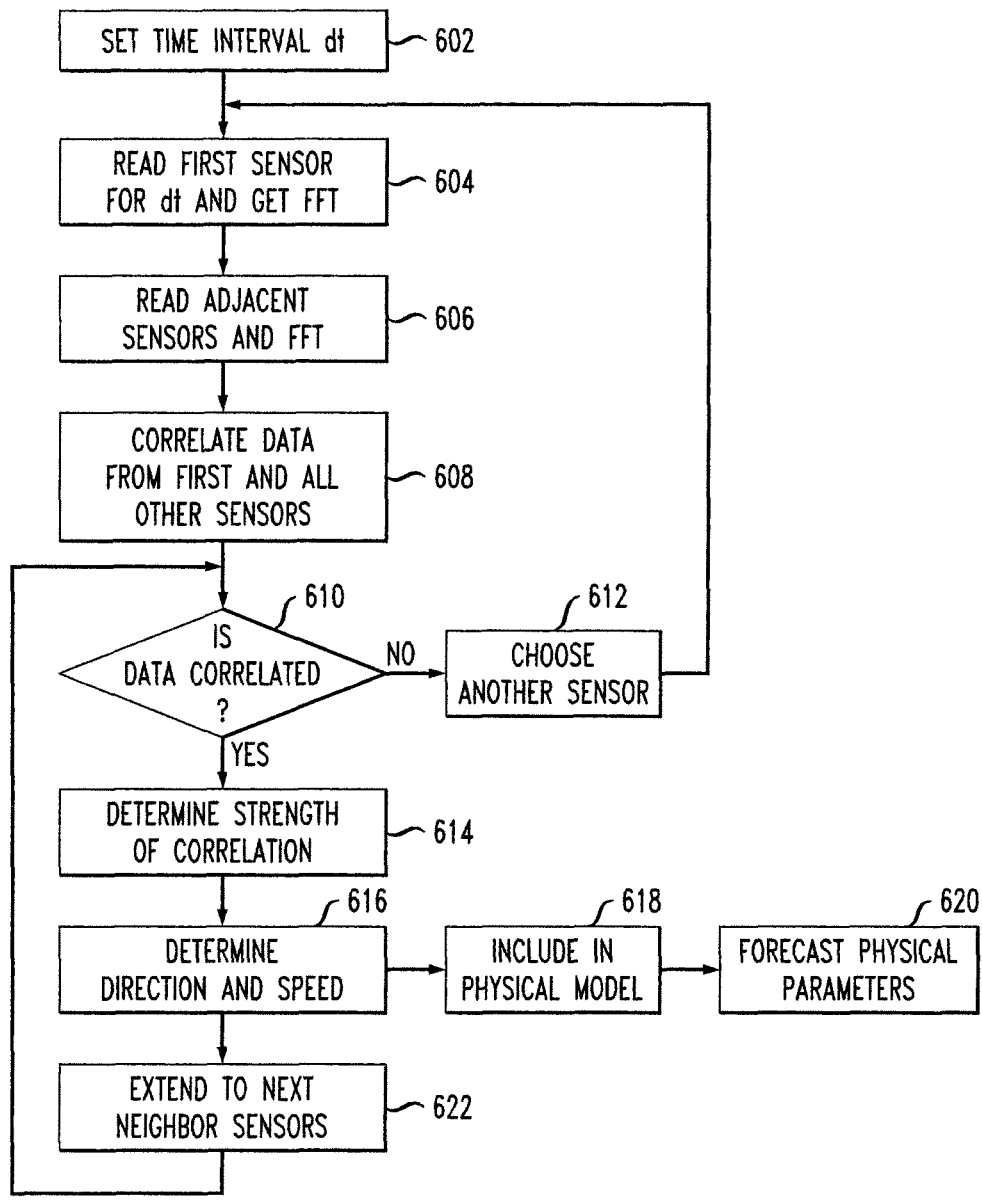
FIG. 6 is a flow diagram illustrating techniques for forecasting physical parameters, according to an embodiment of the invention.

FIG. 6 is a flow diagram illustrating techniques for forecasting physical parameters, according to an embodiment of the present invention. Step 602 includes setting a time interval dt. Step 604 includes reading a first sensor for dt and obtaining a Fast Fourier Transform (FFT). Step 606 includes reading adjacent sensors and FFTs. Additionally, step 608 includes correlating data from the first sensor and the other (adjacent) sensors.

Step 610 includes determining if (portions of) that data is correlated. If there are no correlations, step 612 includes choosing another sensor and the process returns to step 604. If there is a correlation, step 614 includes determining the strength of the correlation. Further, step 616 includes determining the speed and direction of the correlation and step 622 includes extending the correlation to the next neighbor sensors. Additionally, step 618 includes including the correlation in a physical model, and step 620 includes forecasting physical parameters.

Figure 7:
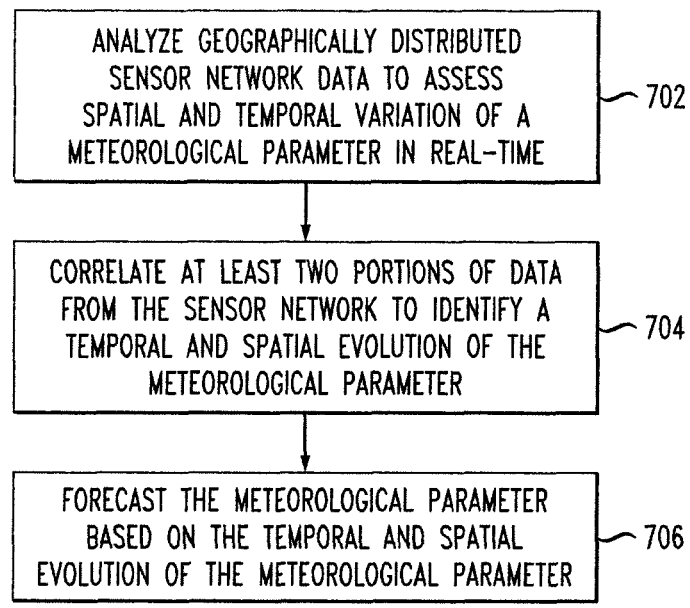
FIG. 7 is a flow diagram illustrating techniques for forecasting a meteorological parameter, according to an embodiment of the invention.

FIG. 7 is a flow diagram illustrating techniques for forecasting a meteorological parameter, according to an embodiment of the present invention. Step 702 includes analyzing geographically distributed sensor network data to assess spatial and temporal variation of a meteorological parameter in real-time. This step can be carried out, for example, using a module as described herein. By way of example, a meteorological parameter can include weather, wind, cloud movement, solar radiation, atmospheric gaseous contamination, etc. Additionally analyzing geographically distributed sensor network data includes extracting at least one pattern. Also, the sensor data can be obtained, for example, from a wired network such as the internet, power line communications, or wireless network, where the sensors are in close proximity and data is sent from one node to another. Further, by way of example, sensor data can be obtained through satellite communications such as cell phone message texting, where data is sent through that network.

Step 704 includes correlating at least two portions of data (for example, data sets) from the sensor network to identify a temporal and spatial evolution of the meteorological parameter. This step can be carried out, for example, using a module as described herein. Correlating at least two portions of data includes correlating data obtained from a near neighbor sensor with data obtained from at least one farther-positioned sensor to determine patterns that are shifted in time.

Step 706 includes forecasting the meteorological parameter based on the temporal and spatial evolution of the meteorological parameter. This step can be carried out, for example, using a module as described herein. Forecasting the meteorological parameter based on the temporal and spatial evolution of the meteorological parameter includes training a physical model for a meteorological parameter prediction based on data from at least one sensor. The data from at least one sensor can include, for example, determined speed of propagation and direction of propagation for the meteorological parameter. Additionally, speed of propagation of the meteorological parameter is estimated based on a time interval between at least two correlated events extracted from neighboring sensors, and direction of propagation of the meteorological parameter is determined via dividing the sensor network into regions to facilitate identification of patterns of events.

Also, an aspect of the invention includes predicting an event at a sensor located in a block neighboring an analyzed region based on the physical model. Further, the prediction can be verified based on continuing sensor measurements that track the events. Additionally, the model can be self-adjusted to take into account the prediction and real-time measurement data to improve forecasting. An aspect of the invention can also includes continuously recalibrating the model based on data from sensors located at and around an area neighboring an analyzed region.

The techniques depicted in FIG. 7 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In an aspect of the invention, the modules can run, for example on a hardware processor. The method steps can then be carried out using the distinct software modules of the system, as described above, executing on the hardware processor. Further, a computer program product can include a tangible computer-readable recordable storage medium with code adapted to be executed to carry out at least one method step described herein, including the provision of the system with the distinct software modules.

Additionally, the techniques depicted in FIG. 7 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention, or elements thereof, can be implemented in the form of an apparatus including a memory and at least one processor that is coupled to the memory and operative to perform exemplary method steps.

Figure 8:
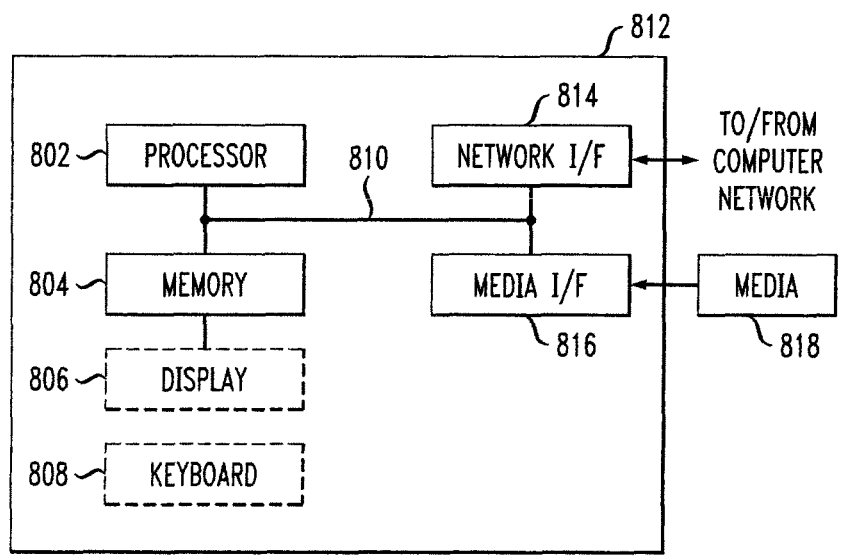
FIG. 8 is a system diagram of an exemplary computer system on which at least one embodiment of the invention can be implemented.

Additionally, an aspect of the present invention can make use of software running on a general purpose computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in at least one of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

As noted, aspects of the present invention may take the form of a computer program product embodied in a computer readable medium having computer readable program code embodied thereon. Also, any combination of computer readable mediums may be utilized. The computer readable medium may be a computer readable storage medium such as, for example, but not limited to, an electronic, magnetic, optical, electromagnetic, infrared, or semiconductor system, apparatus, or device, or any suitable combination of the foregoing. Media block 818 is a non-limiting example. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using an appropriate medium or any suitable combination of multiple media.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 5. The method steps can then be carried out using the distinct software modules and/or sub-modules of the system, as described above, executing on a hardware processor 802. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one aspect of the present invention may provide a beneficial effect such as, for example, using solar panel power output to measure cloud distribution and type.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. An article of manufacture tangibly embodying computer readable instructions which, when implemented, cause a computer to carry out a plurality of method steps comprising:
analyzing geographically distributed sensor network data across two sensors within a first geographic region to assess spatial and temporal variation of cloud movement in real-time, wherein said sensor network data comprise solar panel power output;
determining a correlation across the two sensors by identifying a temporal and spatial evolution of the cloud movement across the two sensors via:
associating a decrease in solar panel power output from each of the two sensors with a time stamp;
determining cloud movement speed corresponding to the decrease in solar panel power output based on (i) a predetermined distance between the two sensors and (ii) the difference between the time stamp associated with the decrease in solar panel power output from each of the two sensors; and
determining a directional pattern of the cloud movement based on (i) a predetermined geographic location of each of the two sensors and (ii) the time stamp associated with the decrease in solar panel power output from each of the two sensors;
determining a strength of the correlation across the two sensors;
determining an extension of the correlation to one or more additional sensors within the first geographic region via:
associating a decrease in solar panel power output from each of the three or more sensors with a time stamp;
determining cloud movement speed corresponding to the decrease in solar panel power output based on (i) a predetermined distance between the three or more sensors and (ii) the difference between the time stamp associated with the decrease in solar panel power output from each of the three or more sensors; and
determining a directional pattern of the cloud movement based on (i) a predetermined geographic location of each of the three or more sensors and (ii) the time stamp associated with the decrease in solar panel power output from each of the three or more sensors;
determining a strength of the extension of the correlation;
forecasting the cloud movement across the first geographic region based on (i) each determined correlation and (ii) the determined strength of each determined correlation;
updating, in real-time, a model comprising satellite data for forecasting weather across a second geographic region based on said forecasting of the cloud movement across the first geographic region, wherein said second geographic region encompasses the first geographic region and one or more additional geographic regions; and
outputting the forecasted cloud movement to at least one of a user and a display;
wherein the plurality of method steps are carried out by the computer linked to the geographically distributed sensor network.

2. The article of manufacture of claim 1, wherein determining the correlation comprises correlating data obtained from a near neighbor sensor with data obtained from at least one farther-positioned sensor to determine a pattern that is shifted in time.

3. The article of manufacture of claim 1, wherein forecasting the cloud movement comprises training a physical model for a cloud movement prediction based on data from at least one sensor.

4. The article of manufacture of claim 3, wherein the computer readable instructions which, when implemented, further cause a computer to carry out a method step comprising predicting an event at a sensor located in a block neighboring an analyzed region based on the physical model.

5. A system for forecasting a meteorological parameter, comprising:
a memory; and
at least one processor coupled to the memory and operative for steps comprising:
analyzing geographically distributed sensor network data across two sensors within a first geographic region to assess spatial and temporal variation of cloud movement in real-time, wherein said sensor network data comprise solar panel power output;
determining a correlation across the two sensors by identifying a temporal and spatial evolution of the cloud movement across the two sensors via:
associating a decrease in solar panel power output from each of the two sensors with a time stamp;
determining cloud movement speed corresponding to the decrease in solar panel power output based on (i) a predetermined distance between the two sensors and (ii) the difference between the time stamp associated with the decrease in solar panel power output from each of the two sensors; and
determining a directional pattern of the cloud movement based on (i) a predetermined geographic location of each of the two sensors and (ii) the time stamp associated with the decrease in solar panel power output from each of the two sensors;
determining a strength of the correlation across the two sensors;
determining an extension of the correlation to one or more additional sensors within the first geographic region via:
associating a decrease in solar panel power output from each of the three or more sensors with a time stamp;
determining cloud movement speed corresponding to the decrease in solar panel power output based on (i) a predetermined distance between the three or more sensors and (ii) the difference between the time stamp associated with the decrease in solar panel power output from each of the three or more sensors; and
determining a directional pattern of the cloud movement based on (i) a predetermined geographic location of each of the three or more sensors and (ii) the time stamp associated with the decrease in solar panel power output from each of the three or more sensors;
determining a strength of the extension of the correlation;
forecasting the cloud movement across the first geographic region based on (i) each determined correlation and (ii) the determined strength of each determined correlation;
updating, in real-time, a model comprising satellite data for forecasting weather across a second geographic region based on said forecasting of the cloud movement across the first geographic region, wherein said second geographic region encompasses the first geographic region and one or more additional geographic regions; and outputting the forecasted cloud movement to at least one of a user and a display;

wherein the steps are carried out by the at least one processor linked to the geographically distributed sensor network.

6. The system of claim 5, wherein determining the correlation comprises correlating data obtained from a near neighbor sensor with data obtained from at least one farther-positioned sensor to determine a pattern that is shifted in time.

7. The system of claim 5, wherein forecasting the cloud movement comprises training a physical model for a cloud movement prediction based on data from at least one sensor.

8. The system of claim 7, wherein the at least one processor coupled to the memory is further operative for predicting an event at a sensor located in a block neighboring an analyzed region based on the physical model.

\* \* \* \* \*